United States Patent
McGinley et al.

(10) Patent No.: US 7,400,056 B2
(45) Date of Patent: Jul. 15, 2008

(54) ENGINE STARTER-GENERATOR OPTIMIZED FOR START FUNCTION

(75) Inventors: Ray M. McGinley, Fountain Hills, AZ (US); Cristian E. Anghel, Tucson, AZ (US); Mingzhou Xu, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 118 days.

(21) Appl. No.: 11/529,968

(22) Filed: Sep. 29, 2006

(65) Prior Publication Data
US 2008/0079262 A1   Apr. 3, 2008

(51) Int. Cl.
*F02N 11/04*   (2006.01)
(52) U.S. Cl. .............................. 290/46; 322/10; 290/31
(58) Field of Classification Search .................... 290/31, 290/32, 46, 47; 322/10, 47, 46
See application file for complete search history.

(56) References Cited

U.S. PATENT DOCUMENTS

| | | | |
|---|---|---|---|
| 4,260,925 A | | 4/1981 | Barrett |
| 4,743,777 A | * | 5/1988 | Shilling et al. ................. 290/46 |
| 5,493,200 A | * | 2/1996 | Rozman et al. ................. 322/10 |
| 5,495,163 A | * | 2/1996 | Rozman et al. ................. 322/10 |
| 6,169,390 B1 | | 1/2001 | Jungreis |
| 6,768,244 B2 | | 7/2004 | Ong et al. |
| 6,847,194 B2 | * | 1/2005 | Sarlioglu et al. .............. 322/10 |
| 6,897,591 B2 | | 5/2005 | Peachee et al. |
| 6,984,911 B2 | | 1/2006 | Horie et al. |
| 7,012,350 B2 | | 3/2006 | Peachee et al. |
| 7,078,826 B2 | * | 7/2006 | Xu et al. ........................ 290/52 |
| 7,227,271 B2 | * | 6/2007 | Anghel et al. .................. 290/31 |
| 7,309,974 B2 | * | 12/2007 | Sarlioglu et al. .............. 322/47 |
| 2002/0093269 A1 | | 7/2002 | Harter et al. |
| 2005/0253395 A1 | | 11/2005 | Blumel |

* cited by examiner

*Primary Examiner*—Nicholas Ponomarenko
(74) *Attorney, Agent, or Firm*—Oral Caglar, Esq.

(57) ABSTRACT

A starter-generator system is configured to supply power to an aircraft electrical bus having a rated AC voltage magnitude, or receive power from a start converter, and includes a rotor and a stator. The stator is disposed at least partially around at least a portion of the rotor and has at least one multi-phase stator winding set wound thereon that has an increased number of turns per phase that is greater than a least number of turns per phase needed to supply power to an aircraft electrical bus at the rated AC voltage magnitude. The increased number of stator turns results in reduced current drawn by the starter-generator during the motor mode, which improves the efficiency and introduces other benefits to the overall starting system.

18 Claims, 2 Drawing Sheets

ENGINE STARTER-GENERATOR OPTIMIZED FOR START FUNCTION

TECHNICAL FIELD

The present invention relates to rotating electrical machines such as starter-generators for gas turbine engines and, more particularly, to a starter-generator with an internal machine voltage greater than the nominal bus voltage of the system to which the starter-generator supplies power in generate mode.

BACKGROUND

Recent aircraft designs have begun to employ an AC starter-generator system which may be used to start the main engines or auxiliary power unit (APU) of an aircraft when operating as a motor, and to supply electrical power to the aircraft electrical bus when operating as a generator. When operating as a motor, a starter-generator is therefore designed to supply mechanical output torque sufficient to start the engines.

The common construction of an aircraft starter-generator includes three separate brushless generators, namely, a permanent magnet generator (PMG), an exciter generator, and a main motor/generator. The PMG includes permanent magnets on its rotor. When the PMG rotor rotates, AC currents are induced in stator windings of the PMG. These AC currents are typically fed to a regulator or a control device, which in turn supplies a DC excitation current when the starter-generator is operating in a generator mode. Conversely, when the starter-generator is operating in a motor mode, the control device supplies AC excitation current.

If the starter-generator is operating in the generator mode, DC current from the regulator or control device is supplied to stator windings of the exciter. As the exciter rotor rotates, three phases of AC current are typically induced in the exciter rotor windings. Rectifier circuits that rotate with the exciter rotor rectify this three-phase AC current, and the resulting DC currents are provided to the rotor windings of the main motor/generator. Finally, as the main motor/generator rotor rotates, three phases of AC voltage are typically induced in the main motor/generator stator, and this three-phase AC power can then be provided to a load.

If the starter-generator is operating in the motor mode, AC power from the control device is supplied to the exciter stator. This AC power induces, via a transformer effect, an electromagnetic field in the exciter armature, whether the exciter rotor is stationary or rotating. The AC currents produced by this induced field are rectified and supplied to the main motor/generator rotor, which produces a DC field in the rotor. A power converter, which may be referred to as a start converter, supplies variable frequency AC power to the main motor/generator stator. This AC power produces a rotating magnetic field in the main stator, which causes the main rotor to rotate and thus supply mechanical output power to a starter-generator shaft. The bulk of the electrical power required to produce the engine starting torque is provided by the start converter. The size, weight, cost, and reliability of the start converter is primarily dependent upon the rated output current during the start mode.

Typically, starter-generators, such as the one described above, are designed to provide a standard rated voltage when operating in the generator mode and driven at a rated speed. In particular, the main motor/generator stator windings are wound with a number of turns that suitably supplies the standard rated voltage when operating in the generator mode. Although starter-generators designed in this manner provide satisfactory service, the machine voltage during the start mode is relatively low, and the system design is penalized. For example, when operating in the motor mode, main motor/generator stator windings wound with a conventional number of turns will generate a relatively low machine voltage. As a result, the electrical current needed to develop a desired level of starting torque can be relatively high. The relatively high current can cause undesirable electrical losses and heating of the starter-generator and of the start converter.

Hence, there is a need for a more efficient starter-generator system and method that can supply a standard rated voltage when operating in the generator mode, yet draws less current as compared to currently used systems, while developing a desired level of torque, when operating in the motor mode. The present invention addresses one or more of these needs.

BRIEF SUMMARY

The present invention provides a starter-generator system that develops sufficient starting torque when operating in a motor mode, yet draws less current in the motor mode as compared to currently used starter-generator systems.

In one embodiment, and by way of example only, a starter-generator for supplying power to an aircraft electrical bus having a rated AC voltage magnitude, or receiving power from a start converter, includes a rotor and a stator. The rotor is configured to rotate and has at least one main field winding wound thereon. The stator is disposed at least partially around at least a portion of the rotor and has at least one multi-phase stator winding set wound thereon. The multi-phase stator winding set has an increased number of turns per phase that are continuously energized when supplying power to the aircraft electrical bus or receiving power from the start converter. The increased number of turns per phase is greater than a least number of continuously energized turns per phase needed to supply the rated AC voltage magnitude.

Other independent features and advantages of the preferred starter-generator system will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background or the following detailed description. In this regard, although the starter-generator is described herein as being used with, for example, an aircraft gas turbine engine, it will be appreciated that it may be used as a starter-generator with gas turbine engines in numerous other environments including, for example, space, marine, land, or other vehicle-related applications where gas turbine engines are used.

Figure 1:
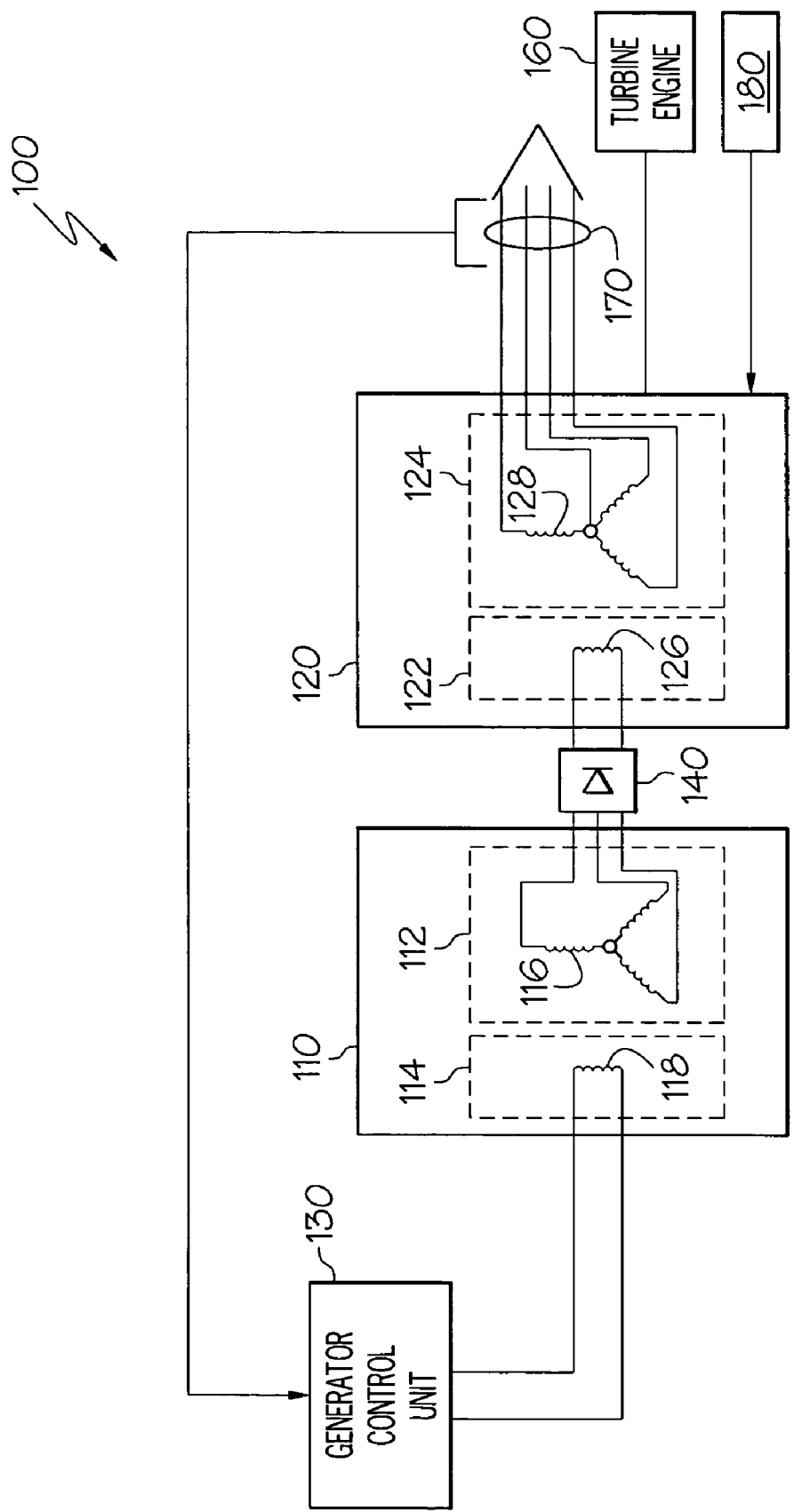
FIG. 1 is a functional schematic diagram of an exemplary generator system according to an embodiment of the present invention.

Turning now to FIG. 1, a functional schematic diagram of an exemplary starter-generator system 100 for use with, for example, an aircraft gas turbine engine, is depicted. This exemplary starter-generator system 100 includes an exciter 110, which includes an exciter rotor 112 and an exciter stator 114, a main starter-generator 120, which includes a main rotor 122 and a main stator 124, a generator control unit 130, and one or more rectifier assemblies 140. It will be appreciated that the starter-generator system 100 may include one or more additional components, sensors, or controllers such as, for example, a permanent magnet generator (PMG), or a rotational speed sensor. However, a description of these additional components, sensors, and controllers, if included, is not needed, and will therefore not be further depicted or described.

In the depicted embodiment, the exciter rotor 112 has a set of multi-phase (e.g., three-phase) exciter armature windings 116 wound thereon, the exciter stator 114 has one or more exciter field windings 118 wound thereon, the main rotor 122 has one or more main field windings 126 wound thereon, and the main stator 124 has a multi-phase (e.g., three-phase) stator winding set 128 wound thereon. When the starter-generator system 100 is operating in a generator mode, the exciter rotor 112 and the main rotor 122 are supplied with a rotational drive force from, for example, an aircraft gas turbine engine 160. The rotational speed of the engine 160, and thus these starter-generator system components, may vary. For example, the rotational speed of the engine from idle to maximum governed speed may vary over a range from 60 to 100 percent rpm. It will be appreciated that this rotational speed range is merely exemplary, and that various other speed ranges may be used.

No matter the specific rotational speed range, it will be appreciated that when the starter-generator system 100 is operating in the generator mode, the generator control unit 130 supplies DC power to the exciter field winding 118. As the exciter rotor 122 rotates, AC currents are induced in the exciter armature windings 116. The rectifier assemblies 140, which are electrically coupled between the exciter armature windings 116 and the main field windings 126, rectify the AC currents and supply DC current to the main field windings 126. As the main field windings 126 rotate, AC power is generated in the stator winding set 128. The AC power is supplied to an AC power bus 170 having a rated AC voltage magnitude.

Figure 2:
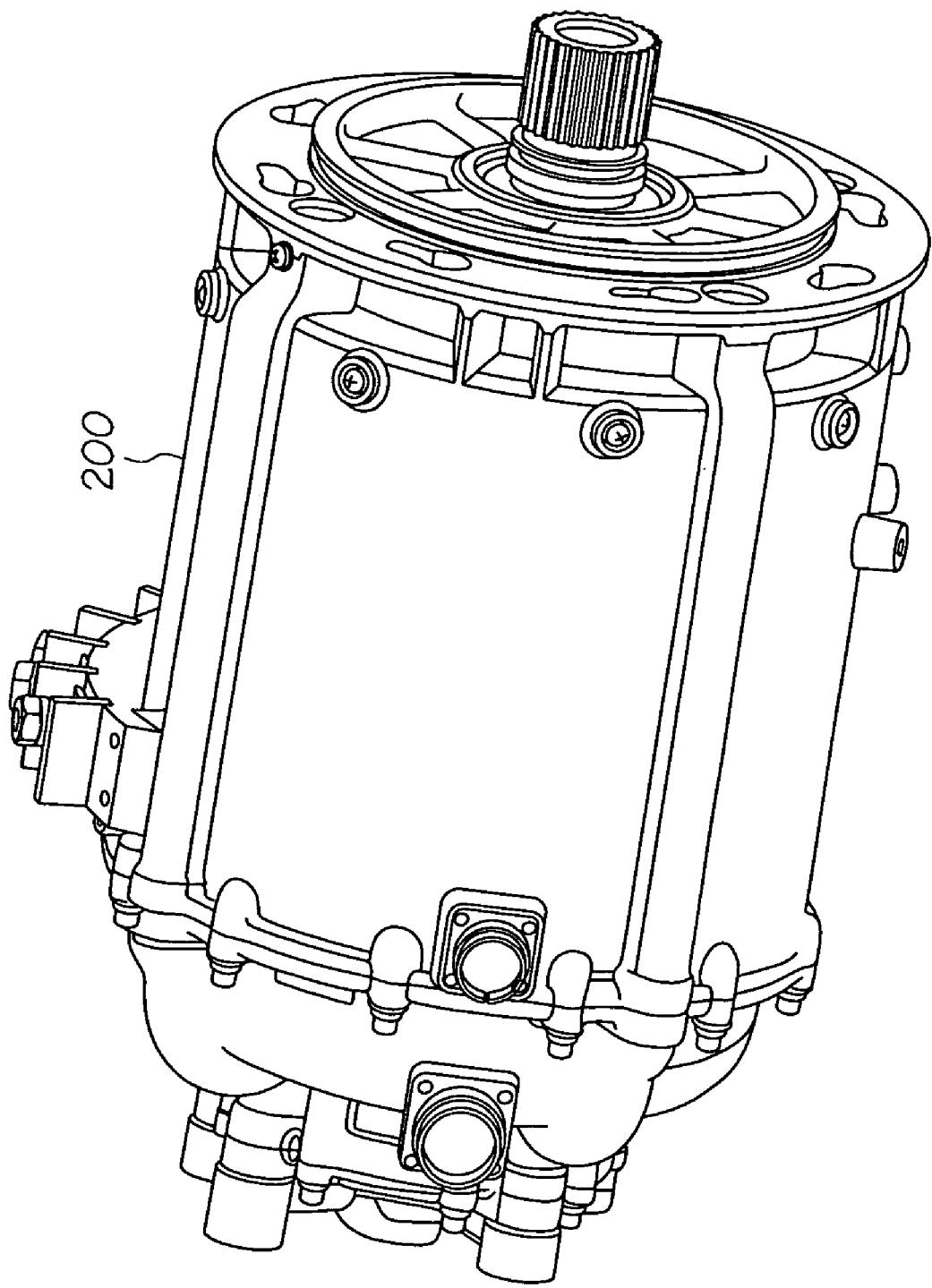
FIG. 2 is a perspective view of a physical embodiment of the starter-generator system depicted in FIG. 1.

When the starter-generator system 100 is operating in the motor mode, AC excitation power is supplied from the control unit 130 to the exciter stator 114. Additionally in the motor mode, a start converter 180 supplies a controlled voltage and frequency to the main stator winding set 128 and thus generates a rotating magnetic field in the stator winding set 128. It will be appreciated that power to the start converter 180 may be supplied by another starter-generator (or generator) driven by an auxiliary power unit (APU), main engine, or external power source. No matter the source of power to the start converter 180, the rotating magnetic field generated in the stator winding set 128 interacts with currents induced in the main field windings 126 from the exciter 110, causing the main rotor 122 to rotate and supply rotational power to the engine 160. As noted above, a non-illustrated position sensing device, such as a resolver unit, may also be included in the system 100 to supply a signal representative of the main rotor 122 position to the control unit 130. This position signal is used to control the AC power supplied to the stator winding set 128 such that the maximum torque is generated. It will be appreciated, however, that the position sensing device need not be included in the starter-generator system 100. Instead, the position signal may be produced using a PMG or a sensorless method, in which rotor position is derived from various electrical signals in the starter-generator system 100. A perspective view of an exemplary physical embodiment of at least those portions of the starter-generator system 100 that are mounted within a housing 200 is illustrated in FIG. 2.

The exemplary starter-generator system 100 described above and depicted in FIG. 1 is, in many aspects, configured similar to a conventional brushless starter-generator; however, it is quite different in at least one aspect. In particular, the stator winding set 128 is wound such that it has an increased number of turns per phase ($N_p$). In other words, the actual number of turns per phase is greater than the number of turns per phase that is needed to supply power to the AC power bus 170 at its rated AC voltage magnitude. The starter-generator system 100 is configured such that the total number of turns per phase in the stator winding set 128 is continuously energized when supplying power to the aircraft electrical bus 170, or receiving power from the start converter 180. As will now be explained, this configuration provides a starter-generator system 100 that can supply AC power at the rated AC voltage magnitude to the aircraft electrical bus 170, and generate sufficient engine starting torque while drawing less current from the start converter 180.

As is generally known, the counter-electromotive force (counter-EMF), which is also referred to as back EMF (BEMF), in a multi-phase AC machine, such as the starter-generator system depicted in FIG. 1, may be expressed by the following relationship:

$$BEMF \propto f\phi N_p,$$

where f is the frequency of the AC voltage supplied to the stator windings, $\phi$ is the air gap flux, and $N_p$ is the number of turns per phase. It may thus be seen that, for a given supply frequency, the BEMF can be varied by varying the number of turns per phase ($N_p$) of the stator winding set 128, since the air gap flux will not vary significantly for a given machine design. It is also generally known that the current drawn by the stator winding set 128 when the starter-generator system 100 is operating in the motor mode is inversely proportional to the BEMF. Thus, the current drawn by the starter-generator system 100 will vary inversely with the number of turns per phase ($N_p$) of the stator winding set 128.

As an example of the above, assume a starter-generator system 100 includes a stator winding set 128 designed with the conventional number of turns per phase ($N_p$) needed to supply AC power at the rated voltage to a 115 VAC system and, during operation in the motor mode, the stator winding set draws 500 amps (A) to generate sufficient starting torque. If the stator winding set 128 is instead designed with an increased number of turns per phase ($N_p$) such as, for example, with the number of turns per phase ($N_p$) that would supply power to a 150 VAC system, and is instead coupled to the 115 VAC system, then the stator winding set 128, during operation in the motor mode, will draw only about 383 A (i.e., (115/150)(500)) from the start converter 180 to generate the same magnitude of starting torque. This reduction in current during the motor mode improves the efficiency of, and has beneficial effects on, the design of the starter-generator system 100 and start converter 180.

It is noted that in the latter case described above, the current drawn by the exciter stator 114 during operation in the generator mode is also reduced. For example, if the exciter stator 114 in the starter-generator system 100 with the conventionally wound stator winding set 128 draws about 3.0 A at full power in the generator mode, then the exciter stator 114 in the starter-generator 100 with the stator winding set 128 having the increased number of turns per phase ($N_p$) will draw about 2.3 A (i.e., (115/150)(3.0)) at full power.

A starter-generator system 100 that is configured with an increased number of turns per phase in the stator winding set 128 of the main stator 124 will draw less current from an aircraft electrical bus, as compared to one configured with a conventional number of turns per phase, when operating in the motor mode. The starter-generator system is not penalized by the additional winding turns, since the magnetic flux strength is sufficient for the starting torque, and the added weight is relatively small compared to the overall advantages. It will be appreciated by those skilled in the art that the increased number of stator turns per phase may introduce a burden to the voltage regulation during the generate mode, and improved regulation methods such as that described in U.S. Pat. No. 6,628,104 may be required. However, the overall benefit of the present invention outweighs the added voltage regulation burden.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A starter-generator for supplying power to an aircraft electrical bus having a rated AC voltage magnitude or receiving power from a start converter, the starter-generator comprising:
   a rotor configured to rotate and having at least one main field winding wound thereon; and
   a stator disposed at least partially around at least a portion of the rotor and having at least one multi-phase stator winding set wound thereon, the multi-phase stator winding set having an increased number of turns per phase that are continuously energized when supplying power to the aircraft electrical bus or receiving power from the start converter, the increased number of turns per phase being greater than a least number of turns per phase needed to supply rated power to the aircraft electrical bus at the rated AC voltage magnitude.

2. The starter-generator of claim 1, further comprising:
   an exciter rotor configured to rotate and having a set of exciter armature windings wound thereon that are electrically coupled to the main field winding; and
   an exciter stator disposed at least partially around at least a portion of the exciter rotor and having an exciter field winding wound thereon.

3. The starter-generator of claim 1, further comprising:
   a plurality of rectifier assemblies electrically coupled in series between the exciter armature windings and the main field winding.

4. The starter-generator of claim 2, further comprising:
   a control unit coupled to the exciter stator and operable to selectively supply DC power and AC power thereto.

5. The starter-generator of claim 4, wherein:
   the control unit supplies AC power to the exciter stator when the starter-generator is operating in a motor mode; and
   the control unit supplies DC power to the exciter stator when the starter-generator is operating in a generator mode.

6. The starter-generator of claim 5, wherein, when the starter-generator is operating in the generator mode, the control unit is coupled to receive one or more signals representative of electrical power supplied by the stator winding set and is operable, in response thereto, to control the electrical excitation of the main field winding.

7. The starter-generator of claim 6, wherein the control unit is further operable to regulate the electrical excitation of the main field winding.

8. A starter-generator for supplying power to an aircraft electrical bus having a rated AC voltage magnitude, or receiving power from a start converter, the starter-generator comprising:
   a housing;
   a rotor rotationally mounted within the housing and having at least one main field winding wound thereon;
   a stator mounted within the housing and disposed at least partially around at least a portion of the rotor, the stator having at least one multi-phase stator winding set wound thereon, the multi-phase stator winding set having an increased number of turns per phase that are continuously energized when supplying power to the aircraft electrical bus or receiving power from the start converter, the increased number of turns per phase being greater than a least number of turns per phase needed to supply rated power to the aircraft electrical bus at the rated AC voltage magnitude;
   an exciter rotor rotationally mounted within the housing and having a set of exciter armature windings wound thereon that are electrically coupled to the main field winding; and
   an exciter stator disposed at least partially around at least a portion of the exciter rotor and having an exciter field winding wound thereon.

9. The starter-generator of claim 8, further comprising:
   a plurality of rectifier assemblies electrically coupled in series between the exciter armature windings and the main field winding.

10. The starter-generator of claim 8, further comprising:
   a control unit coupled to the exciter stator and operable to selectively supply DC power and AC power thereto.

11. The starter-generator of claim 10, wherein:
   the control unit supplies AC power to the exciter stator when the starter-generator is operating in a motor mode; and
   the control unit supplies DC power to the exciter stator when the starter-generator is operating in a generator mode.

12. The starter-generator of claim 11, wherein, when the starter-generator is operating in the generator mode, the control unit is coupled to receive one or more signals representative of electrical power supplied by the stator winding set and is operable, in response thereto, to control the electrical excitation of the main field winding.

13. The starter-generator of claim 12, wherein the control unit, in response to the one or more signals representative of electrical power supplied by stator winding sets, controls electrical excitation of the exciter field winding, to thereby control the electrical excitation of the main field winding.

14. A starter-generator for supplying power to an aircraft electrical bus having a rated AC voltage magnitude, or receiving power from a start converter, the starter-generator comprising:
   a housing;

a rotor rotationally mounted within the housing and having at least one main field winding wound thereon;

a stator mounted within the housing and disposed at least partially around at least a portion of the rotor, the stator having at least one multi-phase stator winding set wound thereon, the multi-phase stator winding set having an increased number of turns per phase that are continuously energized when supplying power to the aircraft electrical bus or receiving power from the start converter, the increased number of turns per phase being greater than a least number of turns per phase needed to supply power to the aircraft electrical bus at the rated AC voltage magnitude;

an exciter rotor rotationally mounted within the housing and having a set of exciter armature windings wound thereon that are electrically coupled to the main field winding;

an exciter stator disposed at least partially around at least a portion of the exciter rotor and having an exciter field winding wound thereon; and a plurality of rectifier assemblies electrically coupled in series between the exciter armature windings and the main field winding.

15. The starter-generator of claim 14, further comprising:

a control unit coupled to the exciter stator and operable to selectively supply DC power and AC power thereto.

16. The starter-generator of claim 15, wherein:

the control unit supplies AC power to the exciter stator when the starter-generator is operating in a motor mode; and the control unit supplies DC power to the exciter stator when the starter-generator is operating in a generator mode.

17. The starter-generator of claim 16, wherein, when the starter-generator is operating in the generator mode, the control unit is coupled to receive one or more signals representative of electrical power supplied by the stator winding set and is operable, in response thereto, to control the electrical excitation of the main field winding.

18. The starter-generator of claim 17, wherein the control unit, in response to the one or more signals representative of electrical power supplied by stator winding sets, controls electrical excitation of the exciter field winding, to thereby control the electrical excitation of the main field winding.

* * * * *